(12) United States Patent
Saito (10) Patent No.: US 6,710,781 B1
(45) Date of Patent: Mar. 23, 2004

(54) IMAGE DISPLAY APPARATUS HAVING DIFFERENT DISPLAY MODE AND METHOD THEREOF

(75) Inventor: Seiji Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 09/654,853

(22) Filed: Sep. 5, 2000

(30) Foreign Application Priority Data

Sep. 6, 1999 (JP) .......................................... P11-251388

(51) Int. Cl.⁷ ................................................ G09G 5/00
(52) U.S. Cl. ...................... 345/619; 345/1.2; 345/3.3; 345/20; 345/660; 348/445; 348/465; 348/467; 348/556; 348/558
(58) Field of Search .......................... 345/1.2, 3.3, 20, 345/619, 990; 348/445, 446, 460, 461, 465, 467, 556, 558, 473–478, 671, 678

(56) References Cited

U.S. PATENT DOCUMENTS

| | | | | |
|---|---|---|---|---|
| 4,568,981 A | * | 2/1986 | Beaulier | 348/586 |
| 4,833,545 A | * | 5/1989 | Yamada et al. | 358/3.21 |
| 5,351,129 A | * | 9/1994 | Lai | 345/634 |
| 5,493,339 A | * | 2/1996 | Birch et al. | 348/461 |
| 5,889,553 A | * | 3/1999 | Kino et al. | 348/208 |
| 6,310,655 B1 | * | 10/2001 | Godwin | 348/445 |
| 6,396,542 B1 | * | 5/2002 | Patel | 348/445 |
| 6,396,544 B1 | * | 5/2002 | Schindler et al. | 348/460 |
| 6,408,129 B1 | * | 6/2002 | Cookson et al. | 369/3 |
| 6,476,821 B2 | * | 11/2002 | Sawada et al. | 345/620 |

\* cited by examiner

Primary Examiner—Bipin Shalwala
Assistant Examiner—Vincent E. Kovalick
(74) Attorney, Agent, or Firm—Jay H. Maioli (57) ABSTRACT

When an image having an aspect ratio of 16:9 is compressed in a vertical direction to be displayed on a display screen having an aspect ratio of 4:3, a gray scale signal is inserted into a top and a bottom of an image signal and a brightness level of the inserted gray scale signal is made to correspond to an average brightness level of the image signal. In addition, when an image having an aspect ratio of 4:3 is compressed in a horizontal direction to be displayed on a display screen having an aspect ratio of 16:9, a gray scale signal is inserted into a right edge and a left edge of an image signal and a brightness level of the inserted gray scale signal is made to correspond to an average brightness level of the image signal. Accordingly, a boundary line between a video image area and a non-video image area due to the difference in luminous characteristics of phosphors becomes hardly recognizable.

2 Claims, 9 Drawing Sheets

IMAGE DISPLAY APPARATUS HAVING DIFFERENT DISPLAY MODE AND METHOD THEREOF

BACKGROUND OF THE INVENTION

1. Field of the Invention

This invention relates to an image display apparatus, which is preferably applicable for displaying a video image having an aspect ratio of 16:9 on a display screen having an aspect ratio of 4:3 or for displaying a video image having an aspect ratio of 4:3 on a display screen having an aspect ratio of 16:9, in particular, an image display apparatus in which a boundary line which occurs between a video image area and a non-video image area, due to the difference in luminous characteristics of phosphors of display elements is hardly recognizable.

2. Description of Related Art

A video display apparatus such as a television receiver using an existing picture tube (cathode-ray tube: CRT) or a video monitor has a display screen having an aspect ratio of 4:3 or 16:9 being a landscape monitor. As information of a video image to be displayed on the display screen, there is video information which shows circularity-1 when displayed by the aspect ratio of 4:3 (here-in after referred to as a 4:3-image) and video information which shows circularity-1 when displayed by aspect the ratio of 16:9 (here-in-after referred to as a 16:9-image).

Accordingly, circularity is not 1 when the video signal is displayed on the display screen having a different aspect ratio from that of the video signal. On this,account a size of the video image is changed or a non-image part is added to a spare space of the video signal in order to make the circularity to be 1 when the video signal is displayed on the display screen having the different aspect ratio.

Figure 8:
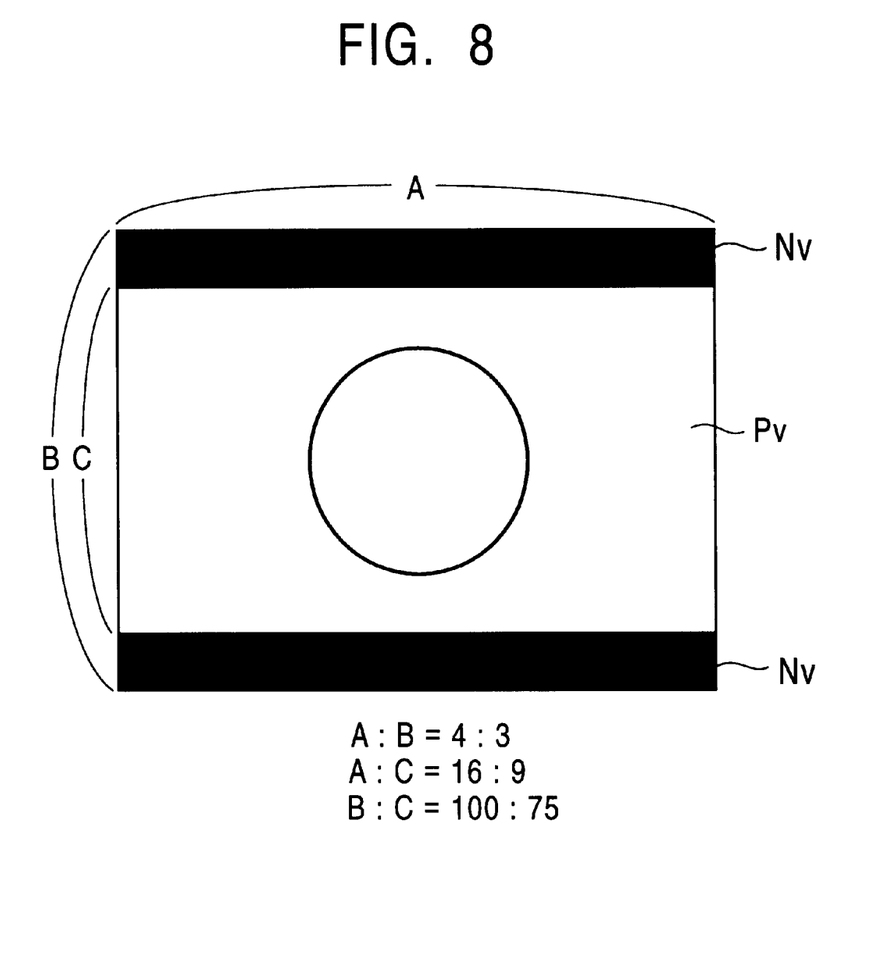
FIG. 8 is a diagram for explaining a conventional image display situation.

For example, when the 16:9-image is displayed on the display screen having the aspect ratio of 4:3 in the video display apparatus, only 75% of a video image area Pv is scanned in the vertical direction of the display screen by a deflected electron beam, so that the size of the displayed image is compressed by 75% as shown in FIG. 8. Thereby, the circularity is maintained to be 1 and the 16:9-image is correctly displayed.

In this case, a top part and a bottom part of the display screen where the deflected electron beam does not scan becomes a non-video image area Nv where the phosphor does not emit light.

Figure 10:
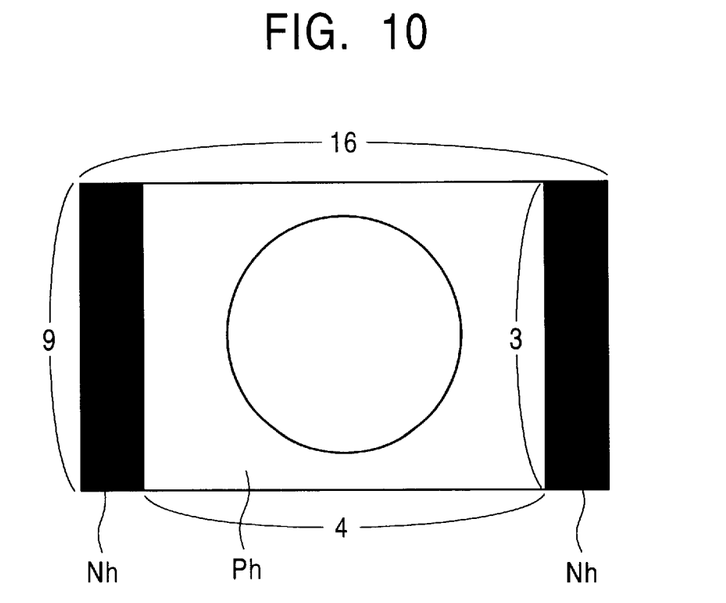
FIG. 10 is a diagram for explaining the conventional image display situation.

In addition, when the 4:3-image is displayed on the display screen having the aspect ratio of 16:9 in the video display apparatus, only 75% of a video image area Ph in the horizontal direction of the display screen is scanned by the deflected electron beam, so that the size of the displayed image is compressed in the horizontal direction by 75% as shown in FIG. 10. Thereby, the circularity becomes 1 and the 4:3-image is correctly displayed.

In this case, a left edge and a right edge of the display screen where the deflected electron beam does not scan becomes a non-video image area Nh where the phosphor does not emit light.

However, when a time period for displaying video images with the compressed image size, as shown in FIG. 8 or FIG. 10, becomes long hours, the luminous characteristics of the phosphors of the CRT become different between the video image area Pv and the non-video image area Nv or between the video image area Ph and the non-video image area Nh.

Accordingly, when the display mode is changed, boundary lines between the video image area Pv and the non-video image area Nv or between the video image area Ph and the non-video image area Nh are recognizably left on the display screen of the CRT.

For example, in the case where the 16:9 image is displayed on the display screen having the aspect ratio of 4:3, the phosphor of the video image area Pv of the 16:9-image emits light in accordance with the video information, but the phosphor of the non-video image area Nv does not emit light at all.

Generally, the luminous characteristics of the phosphor is deteriorated if the duration of emitting time of the phosphor becomes long hours, so that the brightness for the video image area Pv of the 16:9-image becomes darker as compared with the brightness of the non-video image area Nv. As a result, the penumbra is recognized as a line.

After the image to be displayed is switched from the 16:9-image to the 4:3-image, a boundary line between the video image area and the non-video image area of the 16:9-image is left as the line and recognized.

Figure 9:
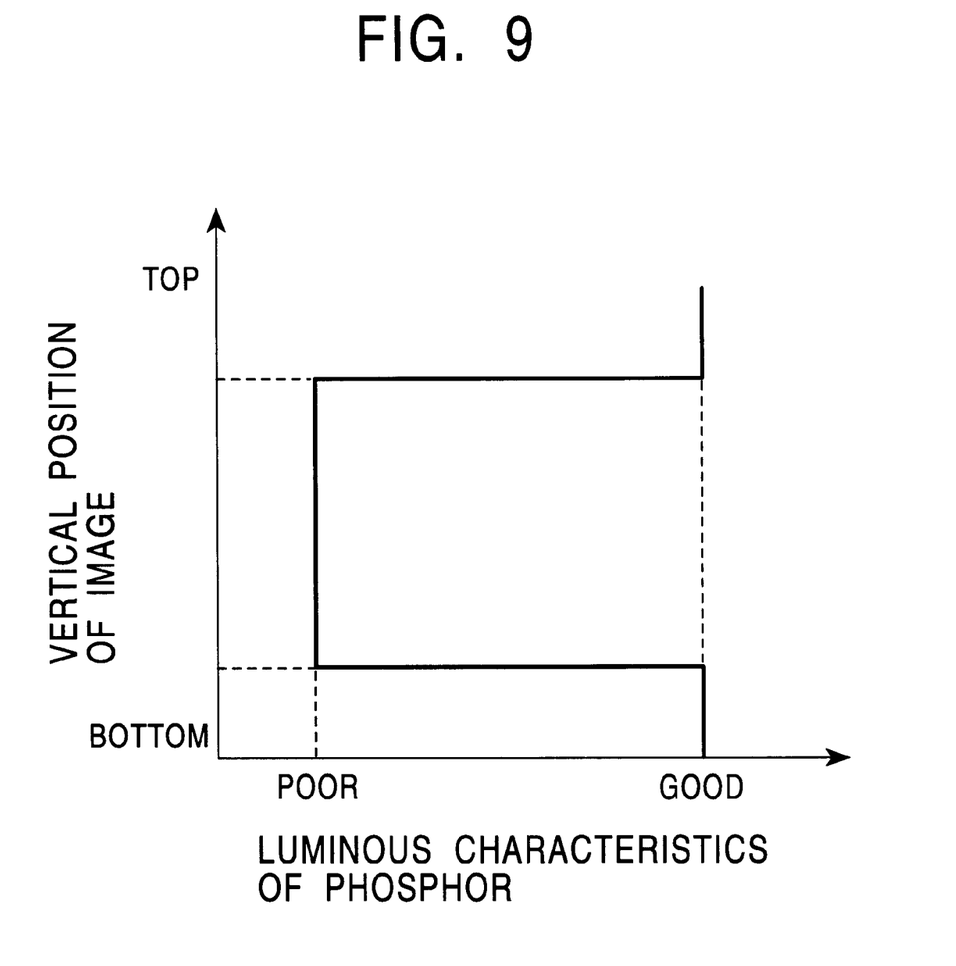
FIG. 9 is a diagram for showing luminous characteristics of the phosphor in the case of FIG. 8.

Relation between a vertical position of the displayed image and the luminous characteristics of the phosphor is as shown in FIG. 9.

Similarly, in a case of FIG. 10, in which the 4:3-image is displayed on the display screen having the aspect ratio of 16:9, if such a condition is kept for a long time, a boundary line between the video image area Ph and the non-video image area Nh is easily recognized.

SUMMARY OF THE INVENTION

The present invention is made in consideration of the above problems and an object of the present invention is to make such a boundary line between the video image area and the non-video image area due to deterioration difference in luminous characteristics of phosphors hardly recognizable.

In order to solve the above-mentioned problem, this invention is to propose a video display apparatus, comprising: supply means for supplying display signals to a display device; mode control means coupled to said supply means for selecting display modes in said display device between a first display mode where an image signal having an aspect ratio of 4:3 is displayed on a display screen of said display device having an aspect ratio of 4:3 and a second display mode where an image signal having an aspect ratio of 16:9 is displayed on said display screen of the display device by compressing the image signal having an aspect ratio of 4:3 in a vertical direction; gray scale signal inserting means coupled to said supply means for inserting a gray scale signal into the image signal in the second display mode; and matching means for making a brightness level of the gray scale signal inserted into said image signal correspond to an average brightness level of said image signal.

According to the first aspect of the present invention, by inserting a gray scale signal into video signals on the head portion and the end portion of the vertical scanning period, it becomes hard to recognize the boundary line between the video image area and the non-video image area due to the difference in luminous characteristics of the phosphors in a case of the CRT, for example. It becomes possible to make the inserted gray scale signal not detectable in a case of an average brightness level of the video signals being zero by making the gray scale signal value correspond to the average brightness level of the video signals.

In another aspect of the present invention, there is provided a video display apparatus, which comprises supply means for supplying display signals to a display device; mode control means coupled to said supply means for selecting display modes in said display device between a first display mode where an image signal having an aspect ratio of 4:3 is displayed on a display screen of said display device having an aspect ratio of 4:3 and a second display mode where an image signal having an aspect ratio of 16:9 is displayed on said display screen of the display device by compressing the image signal having an aspect ratio of 4:3 in a horizontal direction; gray scale signal inserting means coupled to said supply means for inserting a gray scale signal into the image signal in the second display mode; and matching means for making a brightness level of the gray scale signal inserted into said image signal correspond to an average brightness level of said image signal.

According to the second aspect of the present invention, by inserting a gray scale signal into video signals on the head portion and/or the end portion of the horizontal scanning period, it becomes hard to recognize the boundary line between the video image area and the non-video image area due to the difference in luminous characteristics of the phosphors in a case of the CRT, for example. It becomes possible to make the inserted gray scale signal not detectable in a case of an average brightness level of the video signals being zero by making the gray scale signal value correspond to the average brightness level of the video signals.

Further in the another aspect of the present invention, it is presented a method for displaying image signal, comprises the steps of: supplying display signals to a display device; selecting display modes in the display device between a first display mode where an image signal having an aspect ratio of 4:3 is displayed on a display screen of the display device having an aspect ratio of 4:3 and a second display mode where an image signal having an aspect ratio of 16:9 is displayed on the display screen of the display device by compressing the image signal having an aspect ratio of 4:3 in the vertical direction; and inserting a gray scale signal on top and bottom of the image signal in the second display mode, wherein a brightness level of the gray scale signal is set to an average brightness value of the image signal.

Still another aspect of the invention, it is presented a method for displaying image signal, comprising the steps of: supply means for supplying display signals to a display device; selecting display modes in the display device between a first mode where an image signal having an aspect ratio of 16:9 is displayed on a display screen of the display device having an aspect ratio of 16:9 and a second mode where an image signal having the aspect ratio of 4:3 is displayed on the display screen of the display device; and inserting a gray scale signal on left and right of the image signal in the second display mode, wherein a brightness level of the gray scale signal is set to an average brightness value of the image signal.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENT

Figure 1:
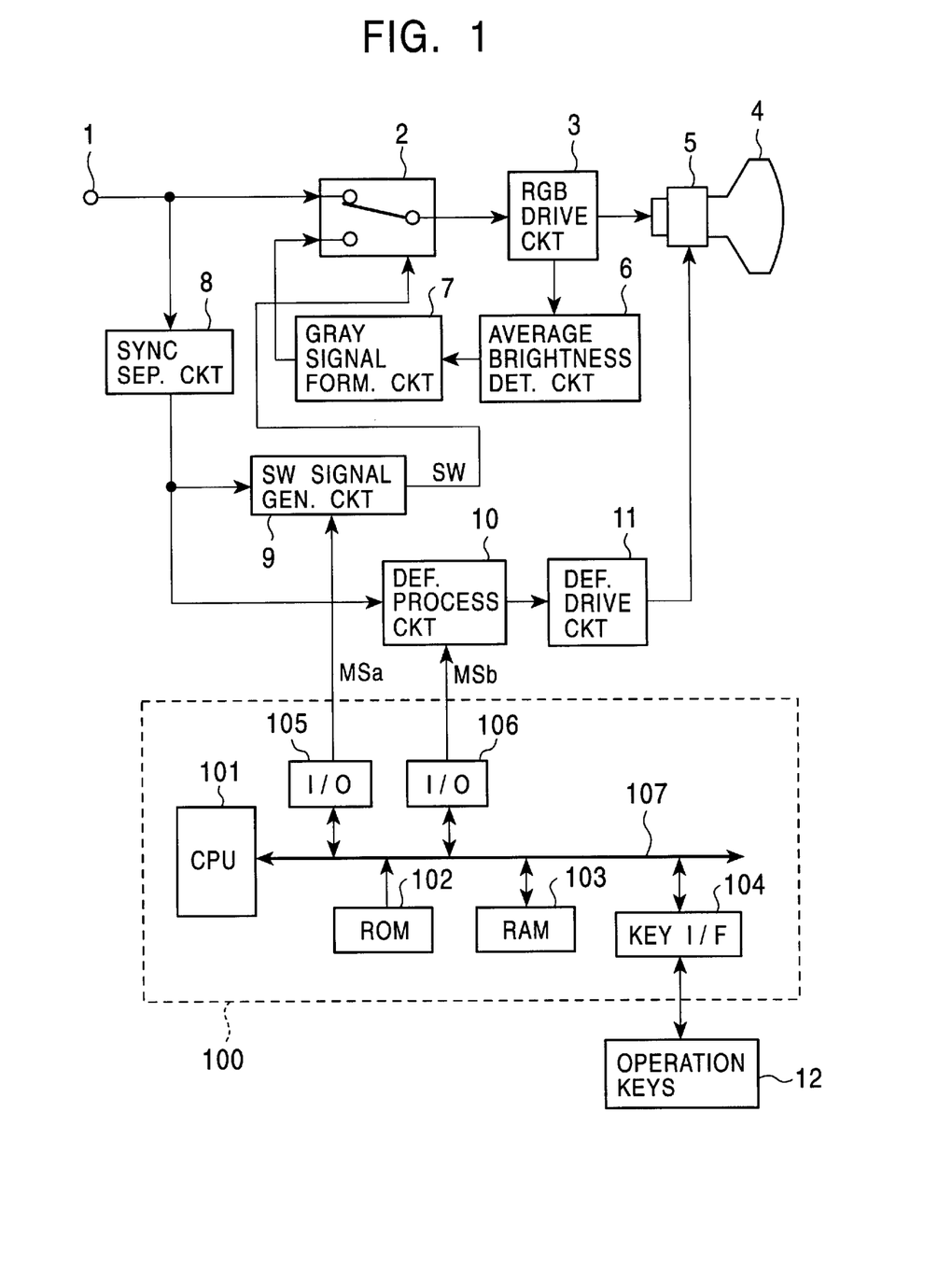
FIG. 1 is a block diagram of constitutional embodiment of a video display apparatus in accordance with the present invention.

One embodiment of the present invention is explained with reference to the attached drawings as follows. FIG. 1 is a block diagram of a preferred embodiment of a video display apparatus in accordance with the present invention, wherein a monitor receiver using a CRT (Cathode Ray Tube) is applied as an image display apparatus of the present invention.

In this embodiment, the monitor receiver is equipped with a first display mode in which a 4:3-image is displayed without changing a size of the image on a display screen of a CRT having an aspect ratio of 4:3 and a second display mode in which a 16:9-image is correctly displayed on the display screen of the CRT by compressing the size of the image by 75% in the vertical direction.

In FIG. 1, a video signal is supplied to an input terminal 1. This video signal is then supplied to one of input terminals of a switching circuit 2. Further a gray scale video signal GR is supplied to the other input terminal of the switching circuit 2 and the video signal supplied to the input terminal 1 is switched to the gray scale video signal GR upon request. The video signal from the switching circuit 2 is then supplied to a CRT 4 through a RGB drive circuit 3. This CRT 4 has a display screen having an aspect ratio of 4:3, the display screen of the CRT 4 is scanned by an electron beam using a deflection yoke 5, and a visible image is appeared on the display screen by light emitted from a phosphor.

In a case of this embodiment, an output video signal from the RGB drive circuit 3 is supplied to an average brightness detecting circuit 6 and an average brightness level of the video signal is detected at this average brightness detecting circuit 6. Thus detected average brightness level controls a level of the gray scale video signal GR supplied from a gray scale signal formation circuit 7. The gray scale video signal GR from this gray scale signal formation circuit 7 is supplied to the other input terminal of the switching circuit 2 as described above.

In addition, the video signal supplied to the input terminal 1 is further supplied to a synchronizing separator circuit 8, and a synchronizing signal is derived out of the video signal. Thus obtained synchronizing signal is then supplied to a switching signal generating circuit 9.

This switching signal generating circuit 9 generates a switching signal SW to be supplied to the switching circuit 2 based on the synchronizing signal and a mode control signal MSa supplied from a control circuit 100 (described later). The switching circuit 2 selects a signal supplied to either one of the input terminals in accordance with the switching signal SW.

In addition, the synchronizing signal derived from the synchronizing separator circuit 8 is supplied to a deflection processing circuit 10. The deflection processing circuit 10 receives a control signal Msb from the control circuit 100 including a microcomputer and executes distortion correction of the displaying image about a size of the image and/or a display position of the image. A deflection signal from this deflection processing circuit 10 is supplied to the deflection yoke 5 through a deflection drive circuit 11, thereby an image is appeared on the display screen of the CRT 4 by scanning the phosphor screen with the electron beam.

The control circuit 100 includes a CPU (Central Processing Unit) 101, a ROM (Read Only Memory) 102, a RAM (Random Access Memory) 103, a key I/F (Interface) 104 and two I/O (Input Output) ports 105 and 106. These are mutually connected each other through a system bus 107.

Operation keys 12 including such as a mode change key or the like are connected to the key I/F 104. The CPU 101 detects key operation by a viewer and generates a suitable control signal corresponding to the detected key operation in accordance with a control program stored in the ROM 102. The mode change key changes the operation mode of the monitor receiver between the first display mode where the 4:3-image is displayed on the display screen having the aspect ratio of 4:3 with 100% size of the image in the horizontal and the vertical directions and the second display mode where the 16:9-image is correctly displayed on the display screen having the aspect ratio of 4:3 by compressing the size of the image by 75% in the vertical direction.

The I/O port 105 is connected to the switching signal generating circuit 9 and the I/O port 106 is connected to the deflection processing circuit 10. The mode control signals MSa and MSb corresponding to the operation of the mode change key among the operation keys 12 are supplied to the switching signal generating circuit 9 and the deflection processing circuit 10 through the I/O port 105 and the I/O port 106.

The mode control signal MSa is such a signal that inverts a situation between high level and low level in response to the first display mode or the second display mode, in other words, a signal indicating the operation mode. The switching signal generating circuit 9 receives the mode control signal MSa, then supplies, as the switching signal SW, a signal which controls the switching circuit 2 to be changed always to the input terminal side to which the video signal from the input terminal 1 is supplied, in the first display mode.

In addition, the switching signal generating circuit 9 supplies, as the switching signal SW, a signal which controls the switching circuit 2 to be changed to the input terminal side for the gray scale video signal GR from the gray scale signal formation circuit 7 during top and bottom intervals of the video image displayed in the video image area Pv and as to be changed to the input side to which the video signal from the input terminal 1 during other interval, respectively, in the second display mode.

In addition, the mode control signal MSb is such a control signal that controls a size of the image signal depending on the first display mode or the second display mode. In other words, in a case of this embodiment, the control signal changes the deflection width in the vertical direction according to the display mode. Namely, the deflection processing circuit 10 controls to deflect the deflected electron beam to scan the display screen with a vertical deflection width of 100% of the display image in the first display mode. But in the second display mode, the vertical deflection width is compressed to 75% in the vertical direction, so that the size of image is also compressed to 75% in the vertical direction. The horizontal deflection width is 100% in both display modes.

In this second display mode, a software program for compressing the size of the video image in the vertical direction by 75% is stored in the ROM 102. In addition, various values necessary for the signal processing are stored in the RAM 103.

Figure 2:
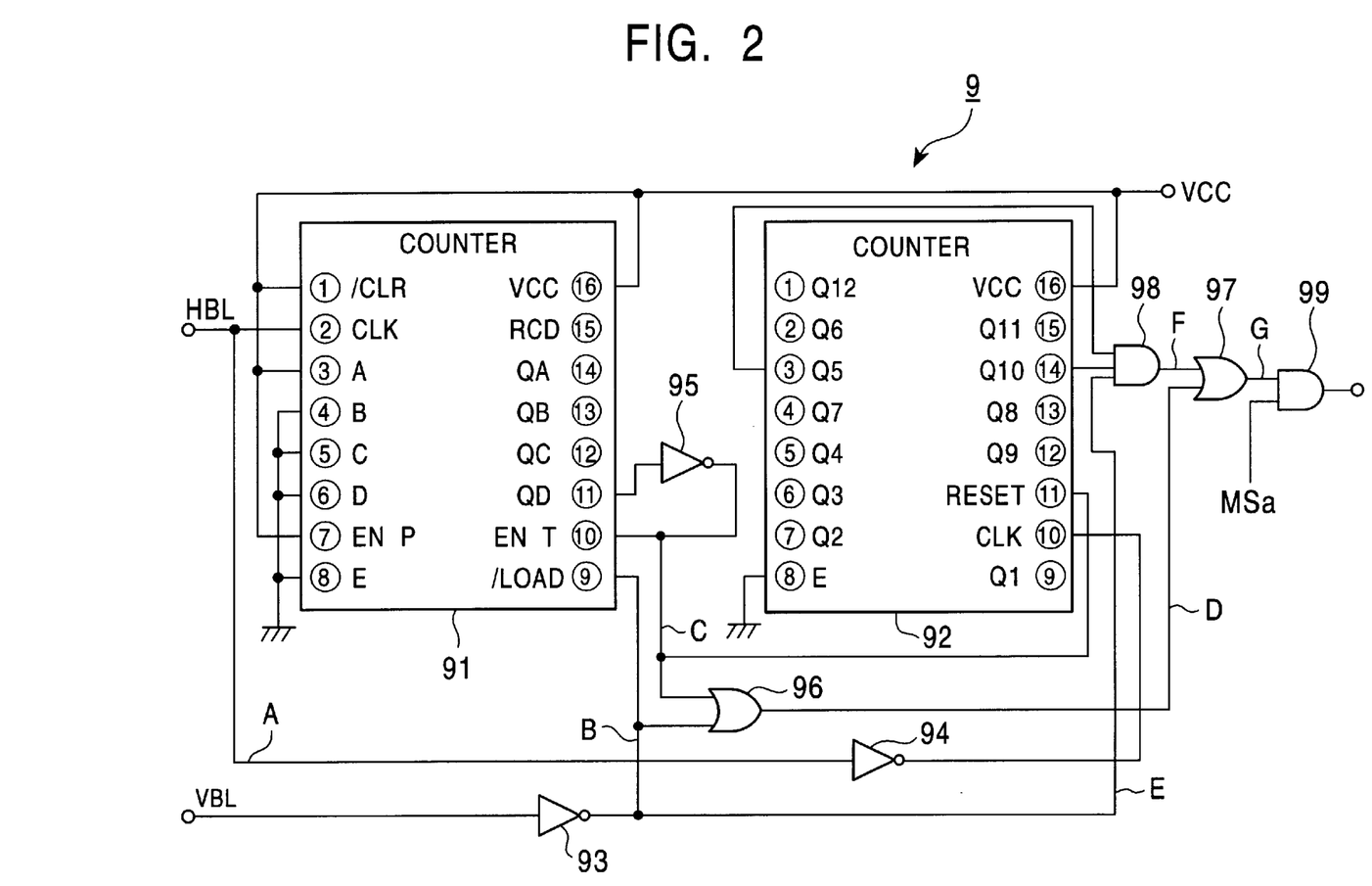
FIG. 2 is a circuit diagram showing a constitutional embodiment of a switching signal formation circuit of FIG. 1.
Figure 3:
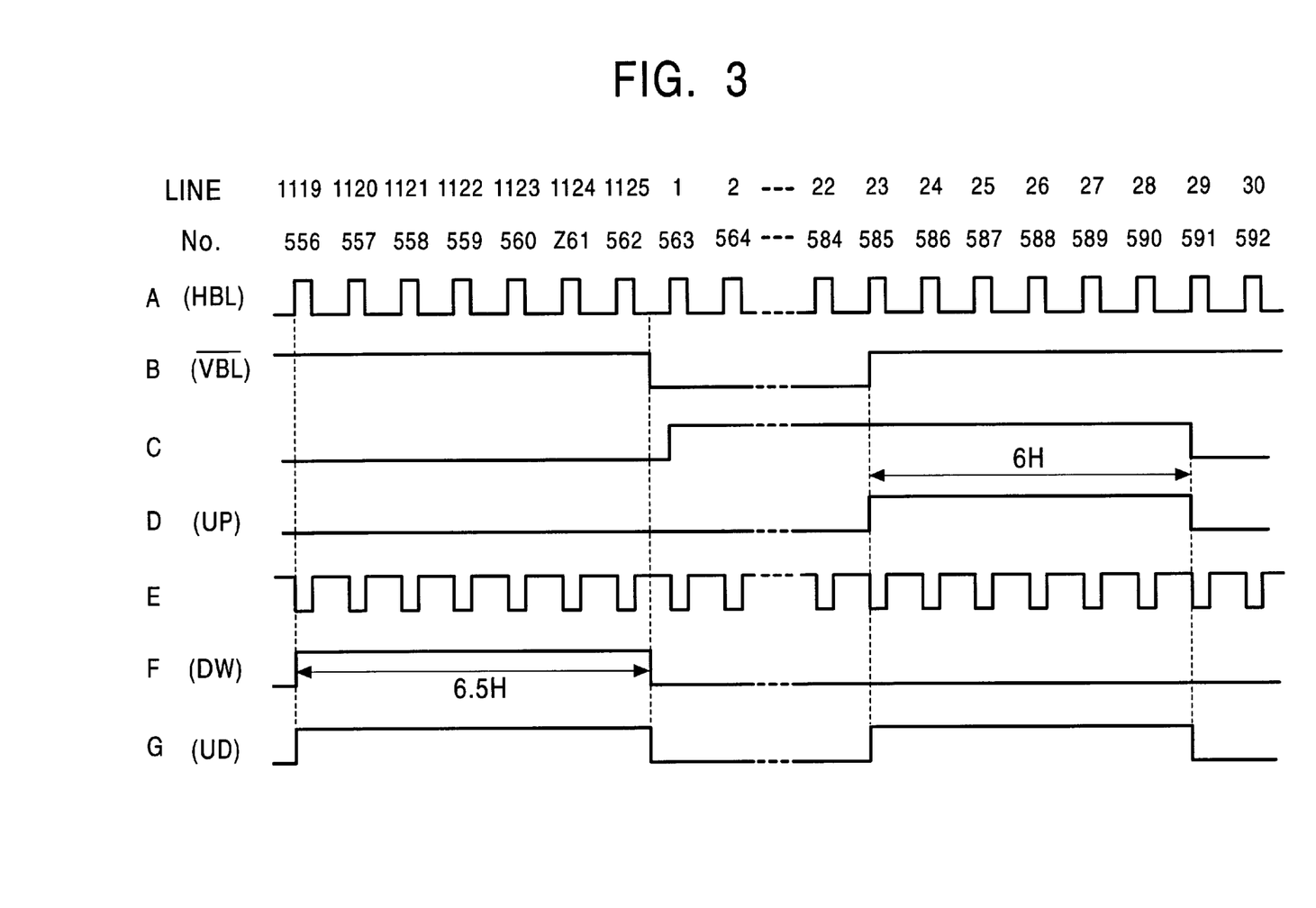
FIG. 3 is a time chart for explaining the operation of the switching signal formation circuit of FIG. 2.

The switching signal generating circuit 9 is constructed as shown in FIG. 2, for example, and includes a pair of counters 91 and 92, three inverters 93, 94 and 95, a pair of OR circuits 96 and 97 and a pair of AND circuits 98 and 99. Waveforms of signals and timing charts of this switching signal generating circuit 9 in FIG. 2 are shown in FIG. 3, taking a case of 1080i of the digital television format as an example.

In the case of 1080i of the digital television, the width of a vertical blanking signal VBL is equivalent to 22.5H (horizontal scanning period).

A pulse UP is generated to have a width of 6H from falling edge of the vertical blanking signal VBL at the counter 91 and a pulse DW to have a width of 6.5H to rising edge of the vertical blanking signal VBL is generated at the counter 92. The pulse UP corresponds to upper 6H interval of the displayed image and the pulse DW corresponds to lower 6.5H interval of the displayed image. Pulse widths of the pulse UP and the pulse DW are just one example and not limited to this example. And these pulse UP and the pulse DW are mixed at the OR circuit 97.

This resulted pulse UD is supplied as the switching signal SW in the second display mode. The switching signal SW is derived from the AND circuit 99 only when the mode is the second display mode due to the mode control signal MSa. Namely, in this example, the mode control signal MSa is low at the first display mode and high at the second display mode.

Accordingly, the switching signal SW is always low in the first display mode in this example, so that the switching circuit 2 is changed to the signal side of the input terminal 1.

On the other hand, in the second mode, the resulted signal UD is supplied to the switching circuit 2 as the switching signal SW. Thereby the gray scale video signal GR from the gray scale signal formation circuit 7 is inserted in 6 horizontal lines from the top and 6.5 horizontal lines from the bottom of the input video signal in stead of the original video signal.

With supplying the synchronizing signal from the synchronizing separator circuit 8 to the microcomputer constituting the control circuit 100, this switching signal generating circuit 9 can be attained by a software.

Figure 4:
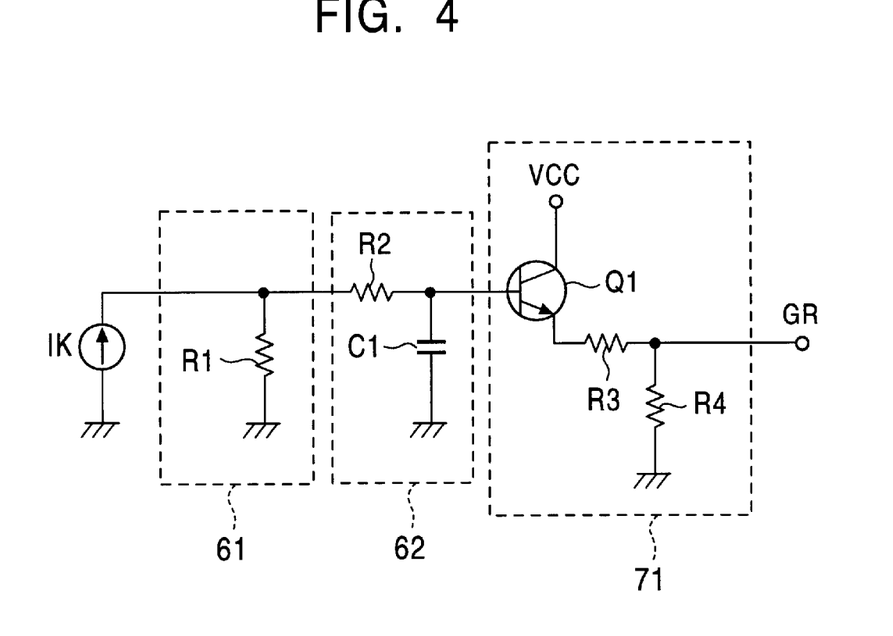
FIG. 4 is a diagram showing an average brightness detecting circuit and a gray scale video signal formation circuit of FIG. 1.

The average brightness detecting circuit 6 and the gray scale signal formation circuit 7 include a circuit configuration as shown in FIG. 4, for example.

In other words, a cathode current IK flowing through the CRT 4 is converted into a voltage signal by a voltage converting circuit 61 comprised of a resister R1, then supplied to an integrating circuit 62 comprised of a resister R2 and a capacitor C1 for averaging processing of the voltage signal obtained from the voltage converting circuit 61. The integrating circuit 62 has a time constant of 100 msec, for example, so that an averaged value of previous 5 fields is detected. Thereby a positive feedback oscillation to the video signal is prevented.

Figure 5:
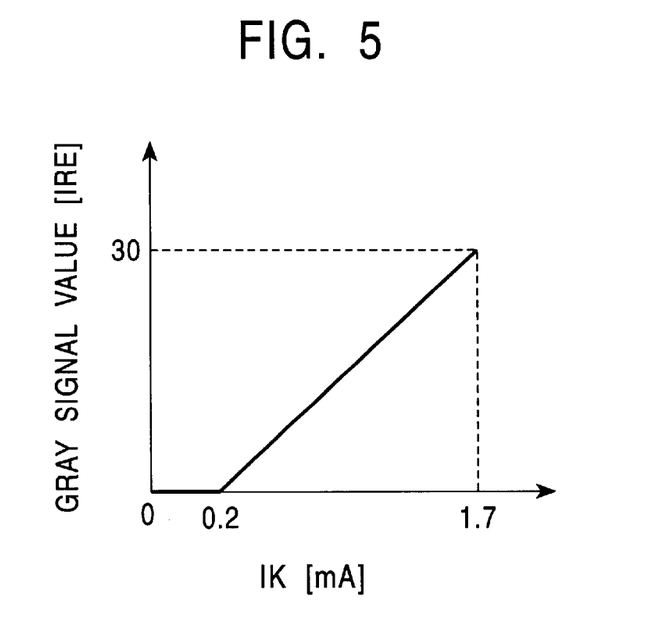
FIG. 5 is a chart for explaining the operation of the average brightness detecting circuit and the gray scale video signal formation circuit of FIG. 4.

Furthermore, the gray scale video signal GR which is proportional to the cathode current IK is generated by supplying the averaged output of the integrating circuit 62 to the drive circuit 71 comprised of a transistor Q1 and resistors R3 and R4. A relationship between the cathode current IK and the level of the gray scale video signal GR is shown in FIG. 5 in this case.

A display operation of the apparatus constructed as shown in FIG. 1 is explained next in the first display mode and in the second display mode.

At first when the first display mode is selected by the mode change key of the operation keys 12, the deflection processing circuit 10 supplies the deflection signal to the deflection drive circuit 11 as described above as to display in 100% without compressing the image size by the mode control signal MSb. In addition, the switching signal SW from the switching signal formation circuit 9 is always kept low, thereby the switching circuit 2 always selects the video signal from the input terminal 1, by the mode control signal MSa. As a result the video image having aspect ratio of 4:3 is displayed on the display screen having the aspect ratio of 4:3 of the CRT 4. Accordingly, the 4:3-image is correctly displayed with circularity 1.

When the second mode is selected next by the mode change key of the operation keys 12, the deflection processing circuit 10 supplies a deflection signal compressed the width of the vertical deflection by 75% to the deflection yoke 5 through the deflection drive circuit 11 as to compress the video image size by 75% in the vertical direction by the mode control signal MSb.

In addition, as described above, the AND circuit 99 is made ON by the mode control signal MSa, so that the resulted signal UD is supplied to the switching circuit 2, as the switching signal SW from the switching signal formation circuit 9. Thereby the gray scale video signal GR is inserted into the video signal from the input terminal 1 at top 6 horizontal lines and at bottom 6.5 horizontal lines of the displayed image. This gray scale video signal GR becomes the average brightness level of the video signal of the time.

Figure 6:
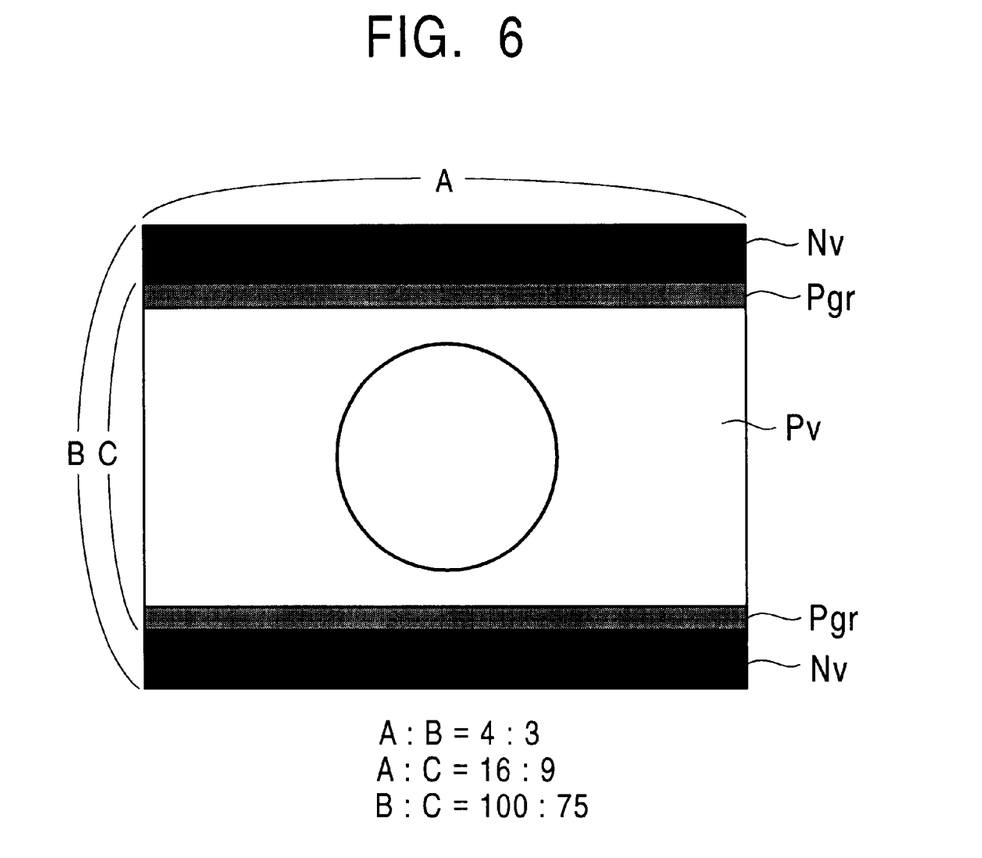
FIG. 6 is a diagram for explaining an image display situation according to the embodiment shown in FIG. 1.

Accordingly, the display status of the display screen in this time becomes as shown in FIG. 6. In other words, the video image having the aspect ratio of 16:9 is displayed on the display screen having the aspect ratio of 4:3 of the CRT 4 including the non-video image area Nv on the top and bottom of the CRT 4 where the electron beam does not scan. Accordingly, the 16:9-image is correctly displayed with the circularity 1. And in this case, a gray area Pgr is formed on top and bottom of the video image area Pv in the video signal having the aspect ratio of 16:9, which are the boundaries with the non-video image area Nv.

In this way, as shown in FIG. 6, when it is considered the case where the gray area Pgr is inserted in the top and bottom part of the 16:9-image is compared with the conventional method depicted in FIG. 8 and FIG. 9, the problem of the boundary lines between the video image area Pv and the non-video image area Nv can be solved as follows.

Figure 7:
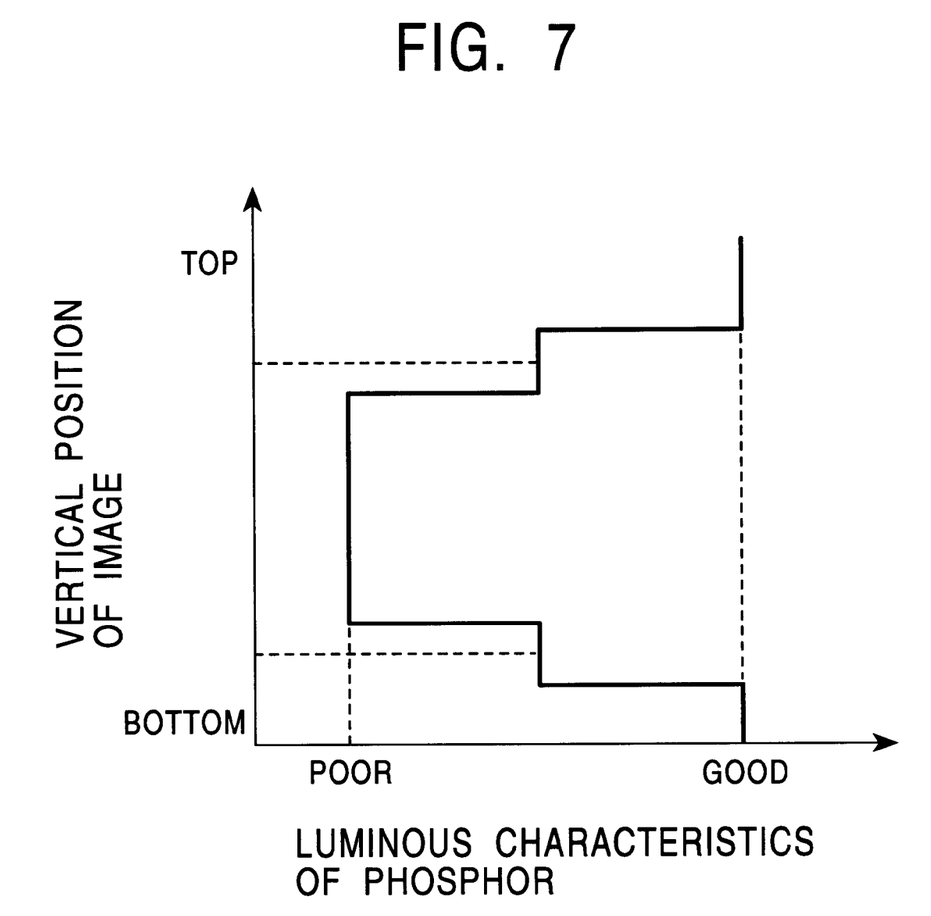
FIG. 7 is a diagram for showing luminous characteristics of the phosphor in the case of FIG. 6.

Shortly, in this case, the gray area Pgr by the gray scale video signal GR is inserted between the video image area Pv and the non-video image area Nv, and the signal level (brightness value) of the gray area Pgr is linked to the average brightness level of the video signal. In this case, the luminous characteristics of the phosphor becomes a stepped form as shown in FIG. 7. Thereby the boundary lines between the video image area Pv and the non-video image area Nv become hard to be recognized.

And when the average brightness level of the video signal is zero, namely when the all black signal or no signal is input, the brightness level of the gray area Pgr becomes zero, so that a viewer can not recognize the inserted gray scale video signal GR.

The above explanation is the case where the 16:9-image signal is correctly displayed on the display screen having the aspect ratio of 4:3 of the video apparatus by compressing the size of the image by 75% in the vertical direction, so that the video signal having the gray area Pgr on top and bottom of the video signal in the vertical direction is displayed. In addition this invention can be applied to the case where the 4:3-image signal is correctly displayed on the display screen having the aspect ratio of 16:9 of the video apparatus by compressing the size of the image by 75% in the horizontal direction.

Figure 11:
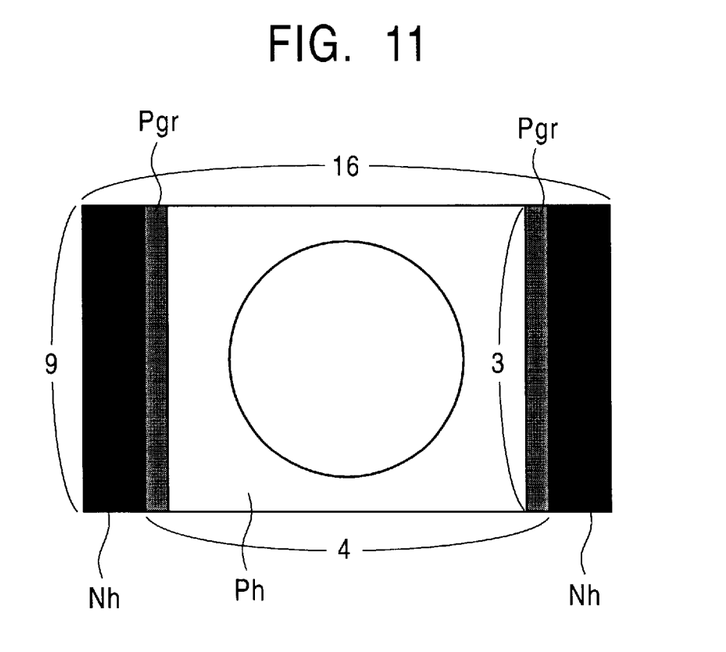
FIG. 11 is a diagram for explaining an image display situation in another embodiment of the present invention.

Shortly, in that case, the gray scale video signal GR having the signal level of the averaged brightness level of the video signal is inserted in a few number of picture element interval at start and end of each horizontal scan interval of the video signal. As shown in FIG. 11, the gray area Pgr is formed on right and left edges of the video image area Ph, namely at the boundaries with the non-video image area Nh. In the construction for inserting the gray scale video signal GR, the switching signal SW for the switching circuit 2 from the switching signal generating circuit 9 is so supplied as to select the gray scale video signal GR from the gray scale signal formation circuit 7 during a few number of picture element interval at start and end of each horizontal scan interval of the video signal.

In the explanation of the above-mentioned embodiment, a viewer changes the modes between the first display mode and the second display mode by the operation keys 12, but if the display mode signal is superimposed on the input video signal, the display mode is automatically selected by detecting the mode signal out of the input video signal to either the first display mode or the second display mode.

The above embodiment is described the case of the monitor receiver, but this invention is also applicable to a television receiver.

In addition, as a display device, it is not limited to a CRT (Cathode Ray Tube), but it is applicable to all type of display device which have problems at the boundary lines between the video image area and no video image area or the non-video image part.

Furthermore, not only the case where the 4:3-image signal is displayed on the display screen having the aspect ratio of 16:9 or the case where the 16:9-image signal is displayed on the display screen having the aspect ratio of 4:3 as to make the circularity to be 1, but also this invention is applied to all type of the video apparatus that has a display mode for displaying the video image with compressed image size in the vertical direction or in the horizontal direction.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A video image apparatus, comprising:
   signal switching means supplied with first and second video signals for switching one of said first and second video signals, wherein said first video signal is an input video signal;

a display device supplied with said one of said first and second video signals for displaying an image of said one of said first and second video signals, said display device having a display screen of a 4:3 aspect ratio;

deflection processing means for processing a vertical deflection width of said displayed image on said display screen;

control means coupled to said signal switching means for selecting a display mode of said display device from a first display mode wherein a full size image is displayed and a second display mode wherein a reduced size image in a vertical direction is displayed, and for outputting to said deflection processing means a size control signal for compressing said vertical deflection width when in said second display mode, and for outputting to said signal switching means a mode control signal for switching from said first to said second video signal at head and end portions of a length of a full horizontal line of said image and a predetermined width of horizontal lines when in said second display mode;

detecting means for detecting an average brightness level of said image by converting a cathode current of said display device to a voltage signal and by integrating said voltage signal; and signal formation means for forming said second video signal, wherein a brightness level of said second video signal is controlled by said integrated voltage signal.

2. A method for displaying an image, comprising the steps of:

switching one of first and second video signala, wherein said first video signal is an input video signal;

displaying said image of said one of said first and second video signals on a display device having a display screen of a 4:3 aspect ratio;

processing a vertical deflection width of said displayed image on said display screen;

selecting a display mode of said display device from a first display mode wherein a full size image is displayed and a second display mode wherein a reduced size image in a vertical direction is displayed;

outputting a size control signal for compressing said vertical deflection width and outputting a mode control signal for switching from said first to said second video signal at head and end portions of a length of a full horizontal line of said image and a predetermined width of horizontal lines when in said second display mode;

detecting an average brightness level of said image by converting a cathode current of said display device to a voltage signal and by integrating said voltage signal; and forming said second video signal, wherein a brightness level of said second video signal is controlled by said integrated voltage signal.

* * * * *